(12) United States Patent
Cheng

(10) Patent No.: US 8,244,803 B2
(45) Date of Patent: *Aug. 14, 2012

(54) METHOD AND APPARATUS FOR DISTRIBUTING DATA TO A PLURALITY OF GAME DEVICES

(75) Inventor: Henry Cheng, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/189,861

(22) Filed: Jul. 25, 2011

(65) Prior Publication Data

US 2011/0282974 A1    Nov. 17, 2011

Related U.S. Application Data

(63) Continuation of application No. 11/504,111, filed on Aug. 15, 2006, now Pat. No. 8,005,892.

(60) Provisional application No. 60/774,195, filed on Feb. 17, 2006.

(51) Int. Cl.
*G06F 15/16* (2006.01)
*G06F 15/173* (2006.01)

(52) U.S. Cl. ............... 709/203; 709/219; 709/205

(58) Field of Classification Search ............ 709/203, 709/205, 219, 230, 232, 237; 370/473, 389, 370/390; 717/173, 168, 171, 172
See application file for complete search history.

(56) References Cited

U.S. PATENT DOCUMENTS

| 5,553,083 | A  | * | 9/1996  | Miller ........................ 714/748 |
| 6,289,012 | B1 | * | 9/2001  | Harrington et al. ........... 370/389 |
| 6,846,239 | B2 | * | 1/2005  | Washio ........................ 463/40 |
| 6,963,923 | B1 | * | 11/2005 | Bennett ....................... 709/232 |
| 7,324,474 | B2 |   | 1/2008  | Shirota et al. |
| 2002/0188678 | A1 | * | 12/2002 | Edecker et al. ............. 709/204 |
| 2003/0046032 | A1 | * | 3/2003  | Puthiyedath ................. 702/188 |
| 2003/0206549 | A1 | * | 11/2003 | Mody et al. ................. 370/390 |
| 2004/0243675 | A1 | * | 12/2004 | Taoyama et al. ............ 709/205 |

* cited by examiner

Primary Examiner — Wing Chan
Assistant Examiner — Ruolei Zong
(74) Attorney, Agent, or Firm — Nixon & Vanderhye PC

(57) ABSTRACT

Striped Multiplexing Download Queue software facilitates and increases throughput for client-server downloads through a limited communication device. In the "DS Download Station" application, this is used to queue many requests and to broadcast download segments to requesters seeking the same data. This works by employing a "download stripe" on both the server and client. The download stripe on the server side tracks acknowledgements from clients per download segment. On the client side, the stripe tracks received segments to account for duplicate data. Requesters are queued on a first-come first-serve basis. Requesters in the queue may receive segments of downloads while waiting in queue, if the client at the front of the queue is downloading the same file. This recursively saves waiting time for clients in the queue.

27 Claims, 7 Drawing Sheets

METHOD AND APPARATUS FOR DISTRIBUTING DATA TO A PLURALITY OF GAME DEVICES

CROSS-REFERENCES TO RELATED APPLICATIONS

This application is a Continuation of application Ser. No. 11/504,111, filed Aug. 15, 2006, which claims the benefit of Provisional Application No. 60/774,195, filed Feb. 17, 2006, the entire content of each of which is hereby incorporated by reference in this application.

FIELD

The exemplary illustrative non-limiting implementations relate to systems and/or methods for distributing data to client devices. More particularly, the exemplary illustrative non-limiting implementations relate to systems and/or methods for distributing a game and/or other data to a plurality of client game devices for game play, or the like.

BACKGROUND AND SUMMARY

With the current availability of networking technology, many video games have been designed to allow a number of players to participate in a game from different locations using different machines. Players often will purchase a game, pay to use an online account, connect to a network using a network cable, and compete against other players in a network environment.

Unfortunately, this conventional model has several drawbacks. First, it often is difficult for a group of players to share a common environment and each play their own version of a game competitively against one another. For example, it often is difficult for a group of players to meet in someone's living room and each play their own version of the game against one another. Each machine would need to be provided with its own display, and each player would need a network connection. Alternatively, the players could play on one television using one game machine, but there are limitations on the number of players that can play the game. These conventional limitations occur because the display typically must to be split to show each individual perspective. Additionally, if a single display is used, each player can see the other players' respective viewpoints, thus becoming aware of where those players are going and what those players are doing.

Recently, smaller handheld devices have been provided with wireless networking capabilities, solving the need for each player to have his own display. These devices may allow players to play a game over a local area network, and friends can gather and compete with one another. In the absence of a server, however, one or more of the wireless devices must act as a server, taking on the role of serving required game play information to all of the devices participating in the game. This distribution requirement can burden the devices, which often are designed to play games, rather than to serve requests from other devices.

Even if a server was provided, it often would be handling a plurality of simultaneous download requests from the devices. While a more expensive server might be able to quickly handle these requests more quickly, it nonetheless is desirable to provide an effective solution to this problem where a limited capability server can efficiently handle a plurality of requests without the need for high-priced hardware.

Another possible use of a server would be to provide that server with a plurality of game demonstrations. The server then could be used to respond to a number of game demonstration file requests. However, this arrangement may have the drawback of creating a bottleneck at the server when a large number of file requests are received in a relatively short period of time.

Problems may occur with conventional arrangements because a server typically will receive a number of requests for a game file and process the requests in the order received. This one-at-a-time processing makes the slowdown worse, because all other users must wait while all the requests ahead of them are served. Typically, the requests come at different times, and the server begins processing one request for a file as it is receiving other requests. Any machine later requesting the file has to wait in line until the preceding file requests have been processed by the server.

Thus, it will be appreciated that there is a need in the art to overcome one or more of the above-noted problems. According to one aspect of the exemplary illustrative non-limiting implementations, a download station and/or server is provided whereby a plurality of file requests can be received and processed in an efficient and effective manner. If a plurality of devices are requesting a single file, the server can send packets, or pieces of the file, to each device simultaneously. The devices can then combine these pieces to create the desired file.

Through this method, the server does not have to wait until it is completed processing a single file request before sending the file to a second device. If a device requests a file, the server will begin transmission. If a second device then requests the same file at a later time, the server will continue transmission of the file, and the second device can also receive the same transmission. The later requesting device will receive the packets relating to the presently untransmitted portions of the file, and then can have the previously transmitted portions of the file sent to it when the previous send request is completed. Thus, at the point where the second device moves up to first in a request queue, it has already received a portion of the file, and completing the file request takes a shorter period of time. Additionally, if a third device has then requested the file, the packets sent to complete the file on the second device can also be sent to the third device, and when that device has moved to the front of the request queue, it will then also have a partially completed version of the file in memory.

This method allows a server to process a plurality of requests for a similar file much more quickly than if the server had to send a full copy of the file to each device before it moved on to process the next file request. For example, if five users requested a file, each request coming at a different time, then the four later requesting users would receive all of the packets currently being sent to the first requesting user while the four users were waiting in the queue. Then, when the first user's request was complete, the three remaining later requesting users would also receive the "fill in" packets sent to the second requesting user's device. This method continues until the last user is the first in line, at which point that user's device already has a portion of the file stored therein, allowing completion of the file in a much shorter time. If additional users have subsequently requested the file, they also will receive pieces of the file sent to any users ahead of them in the queue, so the process can continue, potentially perpetually, eliminating the bottleneck associated with multiple file requests.

According to another aspect of the exemplary illustrative non-limiting implementations, a server is provided with a method of tracking file-receipt acknowledgements. This allows the server to know which packets a given device has received. Once the device has moved to the head of the queue, the server can then determine which packets that device needs to complete the file. This prevents the server from having to re-send the entire file each time and relying on the device to fill in the appropriate packets.

According to a further aspect of the exemplary illustrative non-limiting implementations, a client device is provided with a method of tracking received packets. This way, if a device is, for example, fifth in the queue, the device does not redundantly store duplicate information which may be broadcast to it as it moves up in the queue. Because the server is specifically sending out packets based on the needs of the first device in the queue, a device which is fifth will not have its individual packet needs addressed until it is first in the queue. Because more than one device ahead of it may need the same packets from the server, the server would send those packets out based on the needs of the devices ahead of the fifth device as the queue advanced. By tracking the received packets, the device does not attempt to store duplicate versions of the information as it is broadcasted out based on the needs of the preceding devices.

According to another aspect of the exemplary illustrative non-limiting implementations, packets are sent to a plurality of devices simultaneously. Each device will put in its request for a file, and then monitor a broadcast channel for packets pertaining to that file. Whenever a packet is detected, the device checks an internal list of received packets, and if the presently sent packet has not been received and stored, the device stores the packet and flags it as received.

One application for the exemplary illustrative non-limiting embodiments is use in a game demonstration distribution server. A store or other location provided with a plurality of operable game devices can run a server distributing demo versions of games to various devices. This application prevents a user from having to change a cartridge to demo a new game. Accordingly, the server will be able to provide multiple users with new games more quickly, encouraging users to demo and possibly buy multiple games.

While the application of the exemplary illustrative non-limiting embodiments has been discussed in terms of game systems, it will be appreciated that this method could be used in any distribution system where files are distributed from a central server to a plurality of requesting devices.

Certain exemplary illustrative embodiments relate to a method of distributing files from a server to a plurality of client devices in operable communication with the server. The method may comprise, for example, maintaining a queue of requests, with each request being associated with a client device and a client request for a file. One or more needed portions of the file associated with the request first in queue may be identified, with the one or more needed portions of the file corresponding to portions of the file that the client device associated with the request has not yet received. The needed portions of the file may be simultaneously sent for receipt by the client device associated with the request first in queue and for receipt by each client device also having requested the file.

Certain other exemplary illustrative embodiments relate to a system for distributing files. Such systems may comprise a server and a plurality of client devices. The server and the client devices may be in operable communication. Such systems may further comprise a database of files operably connected to the server. The server may be operable to maintain a queue of requests, each request being associated with a client device and a client request for a file; identify one or more needed portions of the file associated with the request first in queue, the one or more needed portions of the file corresponding to portions of the file that the client device associated with the request has not yet received; and simultaneously send the needed portions of the file for receipt by the client device associated with the request first in queue and for receipt by each client device also having requested the file. Each client device may be operable to receive the file portions sent to it by the server.

Yet further exemplary illustrative embodiments relate to a download station comprising a storage location storing a plurality of files for download to client devices and a processor. The processor may be operable to execute the following steps of: receiving requests for files from the client devices; enqueuing the requests in a queue; tracking the files the client devices have requested, portions of the files already downloaded by the client devices, and portions of the files yet to be downloaded by the client devices; and, simultaneously broadcasting at least a portion of the file for receipt by the client devices based in part on the files the client devices have requested, the portions of the files already downloaded by the client devices, and the portions of the files yet to be downloaded by the client devices.

In certain non-limiting implementations, the portions of the file are sent wirelessly, and in certain non-limiting implementations the portions of the file are sent via a single channel. The client devices may be portable game devices, and the files may be games executable by the client devices and/or game-related data interpretable by the client device. The portions of the files may be packets. A completed request may be dequeued based on a checksum of the file associated with the request.

A server stripe may be maintained on the server. The server stripe may identify, for each request, downloaded portions of the file associated with the request and not yet downloaded portions of the file associated with the request. A request may be dequeued based on the server stripe. The client devices to which the file will be sent may be determined based at least in part on the server stripe. A client stripe on the client device may be maintained. The client stripe may include portions of the file already received by the client device. Portions of the file may be filtered based on the client stripe, the filtering being performed by the client device.

BRIEF DESCRIPTION OF THE DRAWINGS

These and other features and advantages will be better and more completely understood by reference to the following detailed description of exemplary illustrative embodiments in conjunction with the drawings, of which.

DETAILED DESCRIPTION

Figure 1:
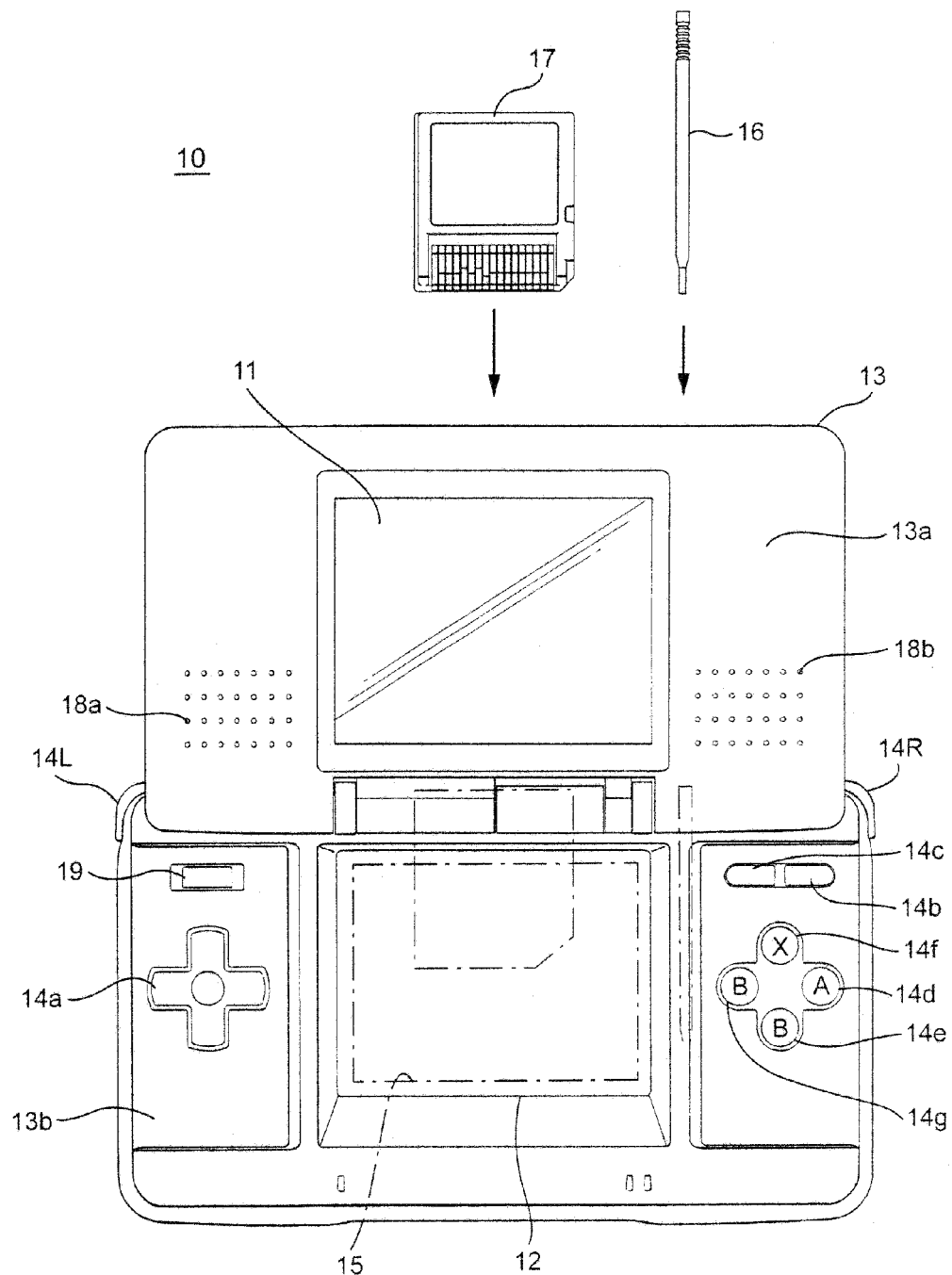
FIG. 1 shows an exemplary external view of an illustrative game device.
Figure 3:
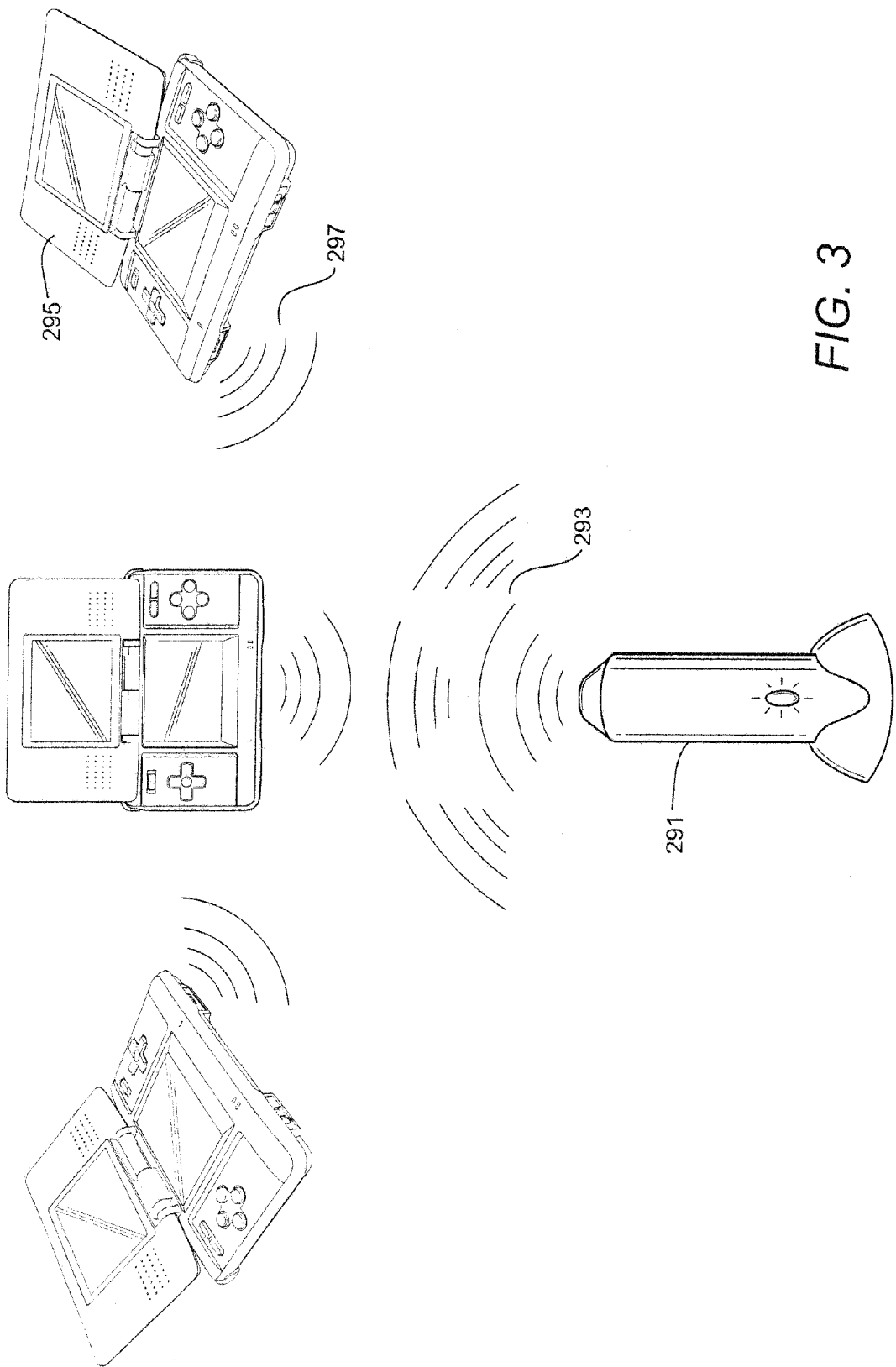
FIG. 3 shows a representation of an exemplary game server and a plurality of illustrative devices communicating with the server.

Referring now more particularly to the drawings, FIG. 1 is an external view of a game device included in the wireless network system shown in FIG. 3. In FIG. 1, a game device includes a first liquid crystal display (LCD) 11 and a second LCD 12. A housing 13 comprises an upper housing 13a and a lower housing 13b. The first LCD 11 is disposed in the upper housing 13a, and the second LCD 12 is disposed in the lower housing 13b. Each of the first and second LCDs 11 and 12 has a resolution of 256 dots×192 dots. Although the present illustrative game device shows an example where LCDs are used as display devices, any other display devices, such as display devices using, for example, electroluminescence (EL) technology, can be used. Also, display devices of any level of resolution can be used.

Figure 2:
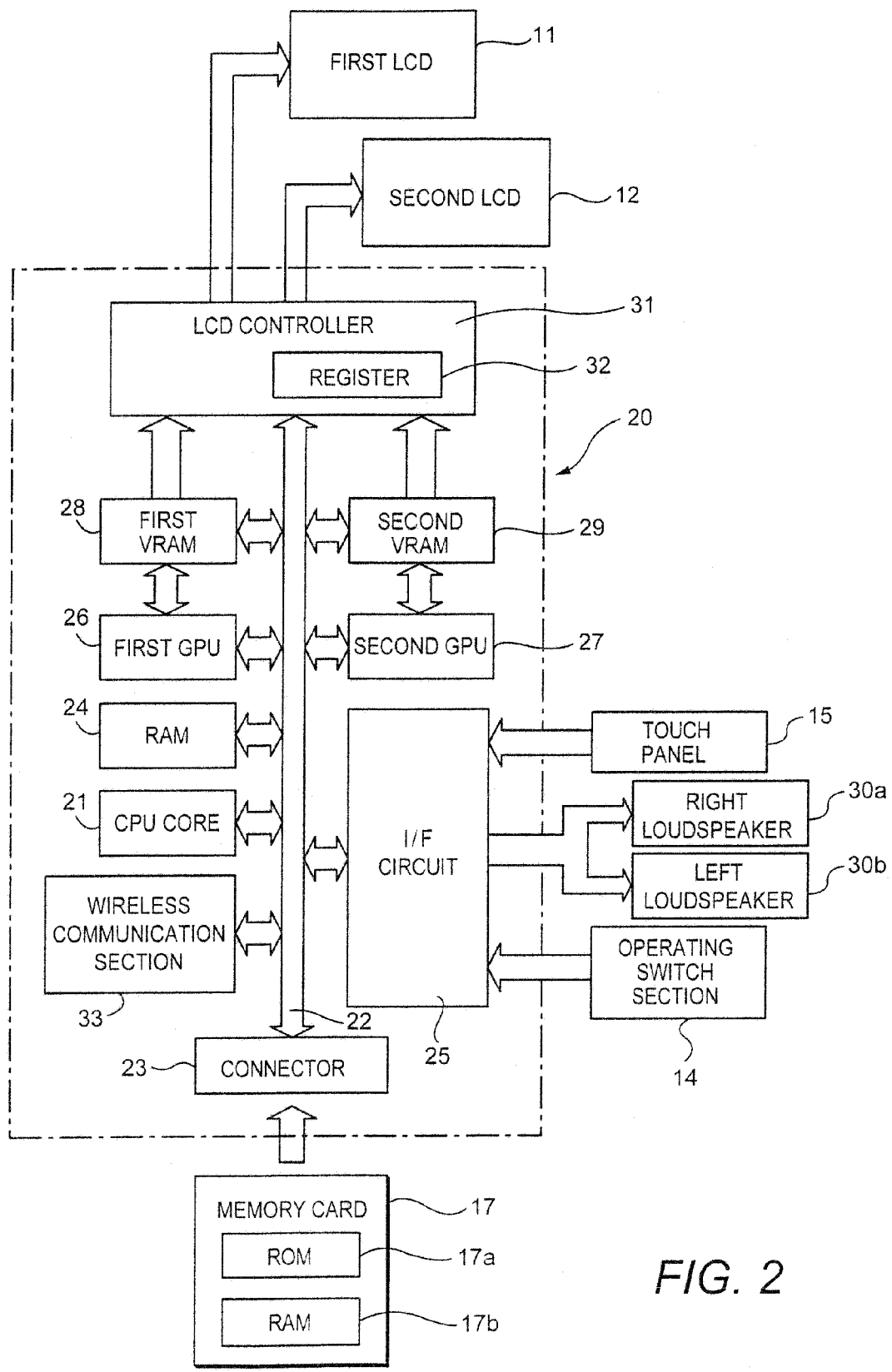
FIG. 2 shows a diagram illustrating an exemplary internal configuration of an illustrative game device.

The upper housing 13a has formed therein sound holes 18a and 18b for emitting sound from a pair of loudspeakers (30a and 30b in FIG. 2, which will be described below). The lower housing 13b is provided with input mechanisms, such as, for example, a cross switch 14a, a start switch 14b, a select switch 14c, an "A" button 14d, a "B" button 14e, an "X" button 14f, a "Y" button 14g, an "L" button 14L, and an "R" button 14R. Also, a further input mechanism (touch panel 15) is mounted on the screen of the second LCD 12. The lower housing 13b is provided with a power switch 19 and insertion slots for receiving a memory card 17 and a stylus 16. The stylus 16 is used for input operations on the touch panel 15.

The memory card 17 is a storage medium having stored therein a game program and a wireless communication program. The memory card is removably loaded into an insertion slot provided in the lower housing 13b.

The internal configuration of the game device 10 will be described with reference to FIG. 2. In FIG. 2, a CPU core 21 is mounted on an electronic circuit board 20, which is disposed in the housing 13. Via a bus 22, the CPU core 21 is connected to a connector 23, an input/output interface circuit 25 (labeled "I/F CIRCUIT" in FIG. 2), a first graphics processing unit (GPU) 26, a second GPU 27, a RAM 24, an LCD controller 31, and a wireless communication section 33. The memory card 17 is detachably connected to the connector 23. The memory card 17 includes a ROM 17a, which has stored therein a game program and a wireless communication program, and a RAM 17b, which has retrievably stored backup data stored therein. The game program and the wireless communication program, which are stored in the ROM 17a of the memory card 17, are loaded on to the RAM 24, and executed by the CPU core 21. In addition to the game program and the wireless communication program, the RAM 24 stores temporary data, which is obtained by the CPU core 22 for executing the game program, and data for generating a game image. The I/F circuit 25 is operably connected to the touch panel 15, a right loudspeaker 30a, a left loudspeaker 30b, and an operation switch section 14 (shown in FIG. 1, including the cross switch 14a, the "A" button 14d, etc). The right loudspeaker 30a and the left loudspeaker 30b are placed inside the sound holes 18a and 18b.

Although the example illustrates an example where the game device 10 includes only one CPU core, the device is not so limited. For example, the game device may be provided with a plurality of CPU cores which share processes by the CPU core 21.

The first GPU 26 is connected to a first video-RAM (VRAM) 28. The second GPU 27 is connected to a second VRAM 29. In accordance with an instruction from the CPU core 21, the first GPU 26 generates a first game image on the basis of data used for image generation stored in the RAM 24, and writes the image into the first VRAM 28. Similarly, in accordance with an instruction from the CPU core 21, the second GPU 27 generates a second game image, and writes the image into the second VRAM 29. The first and second VRAMs 28 and 29 are connected to the LCD controller 31.

The LCD controller 31 includes a register 32. The register 32 stores a value of 0 or 1 in accordance with an instruction from the CPU core 21. If the value in the register 32 is 0, the LCD controller 31 outputs to the first LCD 11 the first game image written on the first VRAM 28, and also outputs to the second LCD 12 the second game image written on the second VRAM 29. Alternatively, if the value of the register 32 is 1, the first game image written on the first VRAM 28 is output to the second LCD 12, and the second game image written on the second VRAM 29 is output to the first LCD 11.

The wireless communication section 33 is operable to exchange game process and other data with a wireless communication section 33 of another game device. In the present example device, it is assumed that a wireless communication section has a radio communication function in conformity with IEEE 802.11 wireless LAN standards, for example.

It will be appreciated that the above-described configuration of the game device 10 is merely illustrative and should not be construed as limiting. Also, the game program and wireless communication program may be supplied to the game device 10 not only via an external storage medium, such as the memory card 17, but also via a wired or wireless communication channel. Alternatively or in addition, the game program and wireless communication program may be previously stored in a nonvolatile storage device within the game device 10.

According to one aspect of the exemplary illustrative non-limiting implementations, as shown in FIG. 3, a server 291 is provided to serve out copies of files to one or more requesting devices 295. The server 291 is configured to communicate wirelessly 293 with the devices 295, and the devices 295 are also provided with wireless communication 297 capability.

According to an exemplary illustrative non-limiting embodiment, the server 291 receives requests from the devices and broadcasts packets pertaining to requested files. Devices that request a particular file monitor the broadcast channel and receive and store the broadcast packets, assembling them to complete the requested file.

Figure 4:
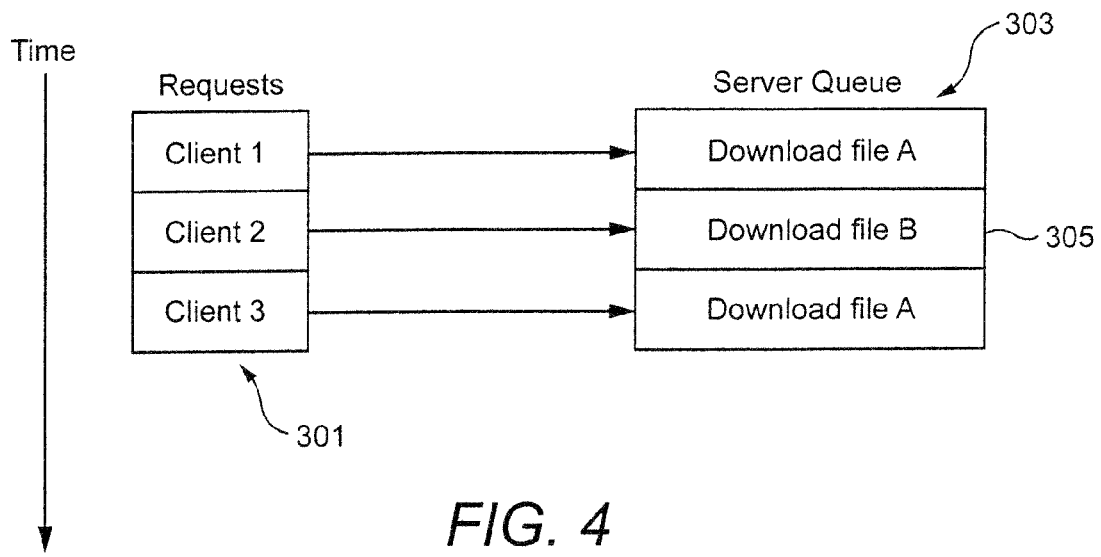
FIG. 4 shows a representation of an exemplary client request queuing operation.

An exemplary representation of a server queuing operation is shown in FIG. 4. As time passes, requests 301 are received from various clients. The server builds a client requests queue 303, which is implemented as a first-in, first-out (FIFO) queue in this exemplary representation. If the request 305 from Client 1 is received first, it will be the first request processed. Although this exemplary representation shows a FIFO queue, any type of queue may be used instead of a FIFO queue, such as, for example, a LIFO queue, a priority queue, etc. Also, it will be appreciated that the queue may be implemented as a one or more stacks, as a heap, etc. In the example shown in FIG. 4, Clients 1 and 3 request File A, and Client 2 requests File B, all for download.

Figure 5:
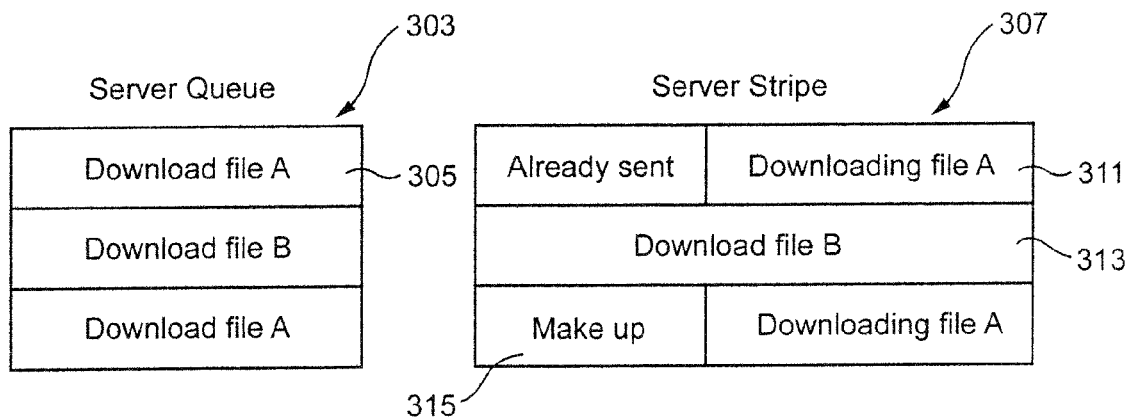
FIG. 5 shows a representation of an exemplary client request processing operation performed by a server.

FIG. 5 shows an exemplary representation of a client request processing operation performed by a server. In this representation, a client first in the queue 303 has requested file A 305. A client second in the queue has requested file B, and a client third in the queue also has requested file A.

In a conventional system, the server would process the requests in a designated order. For example, if a FIFO queue were implemented with such a conventional system, each client would receive their file in the order that they requested it. This means that the client also requesting file A and third in line would have to wait for A to be sent to the first client, for B to be sent to the second client, and then for A to be re-sent to the third client.

According to one aspect of the exemplary illustrative non-limiting implementations, once the first request for A 305 is being processed, the client third in line also can benefit from the processing of this request. Once the first request for A 305 is in, the server checks to see what information that client already has received. In this case, the information already received is designated by the "already sent" area 309. Then, the server sends all information that had not yet been received by that client, designated by the "downloading file A" area 311. However, because the server is broadcasting this information and the third client is monitoring the channel for information relating to file A, the third client also can store this information, partially completing the file requested by the third client. Once the server request for A is complete for the first client, the server then will move on and send file B 313. Finally, after B is sent, the third client only needs to fill in the missing information designated by the "make up" area 315. Because "make up" area 315 represents only a portion of the file, the client will not need to wait for the entire file to be re-sent in its entirety. Additionally, any other clients having subsequently requested file A will be able to receive the data that is being sent to the third client. This information corresponding to, for example, which clients have requested which files, the pieces of the files already received, and the pieces of the files yet to be received, is tracked in server stripe 307, which may be located on the server. It will be appreciated that in certain other exemplary illustrative embodiments, other information in addition to and/or in place of the information described herein may be stored. Also, it will be appreciated that the server stripe (or corresponding information store) may be located on the client, in a separate database, etc., depending on the particular implementation.

Figure 6:
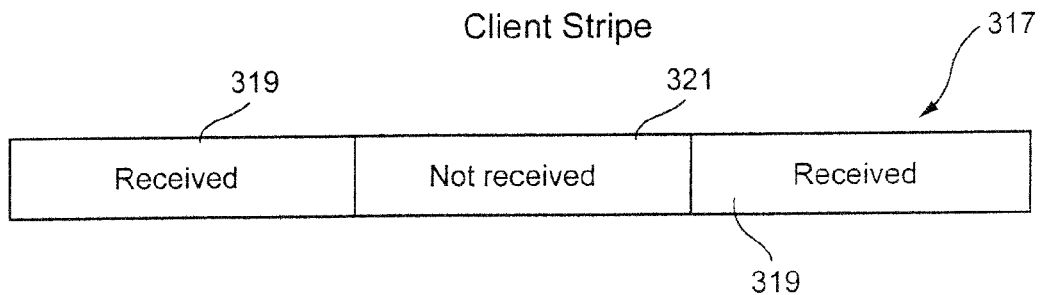
FIG. 6 shows a representation of an exemplary server information receipt processing operation performed by a client.

FIG. 6 shows an exemplary representation of a server information receipt processing operation performed by a client. Because the requested files may be broadcasted to the client in a fragmented form, the client may need to track which packets have already been received. This tracking process allows the client to store the needed packets only once, and prevents a mistaken alteration of a checksum that may be used to check for file completeness. The client tracks the whole file 317, and it can determine which packets have been received 319 and which packets are still needed 321. If a packet is received that previously has not yet been received, the client saves the packet and updates the checksum and the marker for that packet. Once the checksum matches the expected sum, the client can stop downloading the file and can process it. It will be appreciated that in certain exemplary illustrative embodiments, the downloaded packets may be inserted into the ultimate file in the correct places, thus potentially eliminating the need to reorder the packet after all data has been received. It also will be appreciated that other data verification methods may be used apart from, or in addition to, checksums, such as wireless checksums.

Figure 7A:
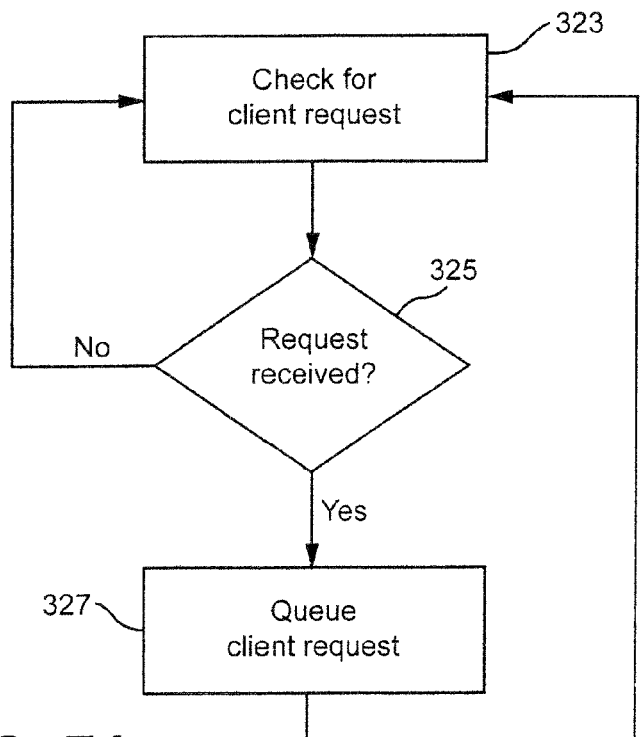
FIG. 7A shows an illustrative flowchart detailing an exemplary client request queuing operation.

FIG. 7A shows a flowchart detailing an exemplary client request queuing operation. When the server receives a request from a client, the server needs to order those requests in some fashion. According to an exemplary representation, the server checks for incoming client requests 323. If a request is received 325 the server adds the client request to the queue 327. If no requests are received, or after the server has added the request to the queue, the server returns to looking for client requests 323.

Figure 7B:
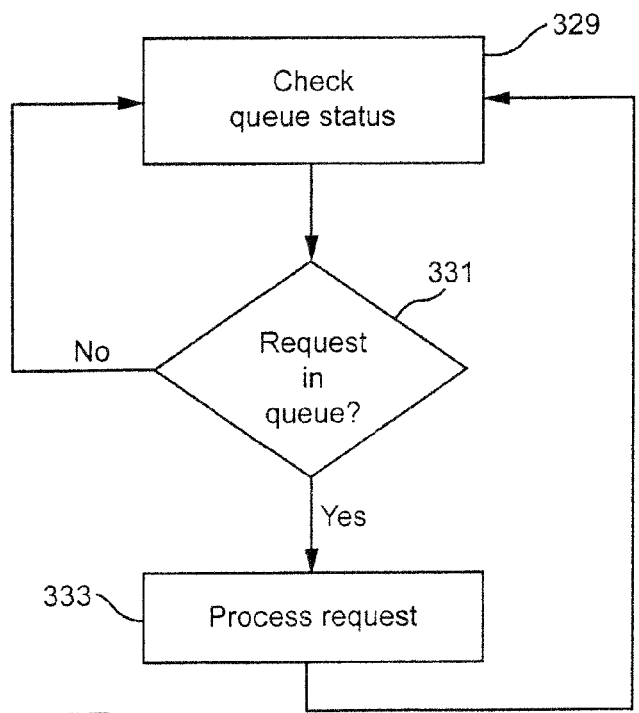
FIG. 7B shows an illustrative flowchart detailing an exemplary queue processing operation.

FIG. 7B shows a flowchart detailing an exemplary queue processing operation. First, the server checks to see if there are any requests pending in the queue 329. If the server finds a pending request 331, the server processes that request and sends out the desired information. If the server does not find a request, or when the current request processing is complete, the server then checks the queue again for requests 329.

Figure 8:
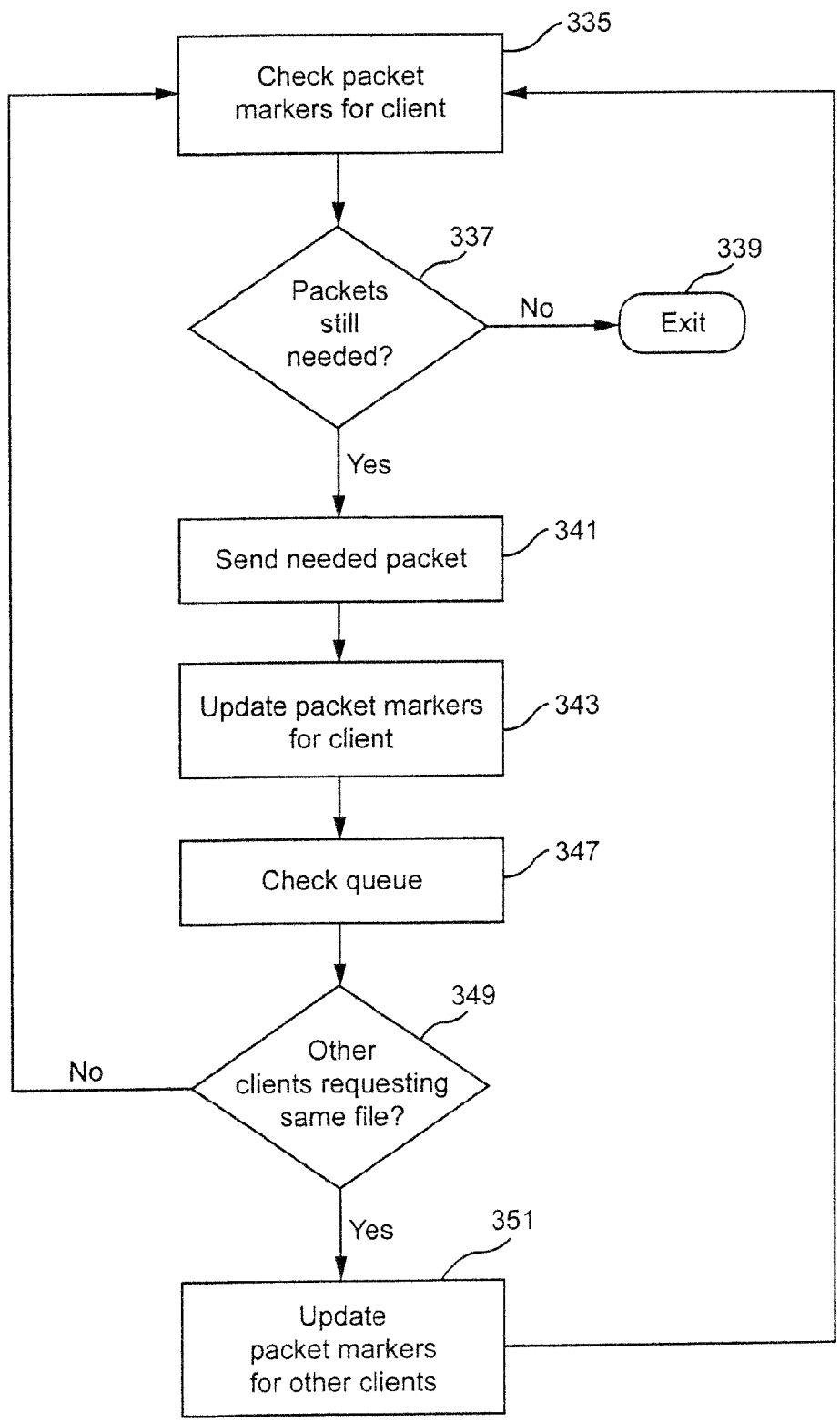
FIG. 8 shows an illustrative flowchart detailing an exemplary client request processing operation; and, FIG. 9 shows an illustrative flowchart detailing an exemplary server information receipt processing operation.

FIG. 8 shows a flowchart detailing an exemplary client request processing operation. If the server finds a request pending in the queue, the server must then process that request. According to one aspect of an exemplary illustrative non-limiting implementation, the server checks markers which it has stored for a particular client. These markers may be set when earlier packets were broadcast while the current request was still pending in the queue. For example, if a file has ten packets, and packets two, three and seven have been sent while the current client was waiting in the queue, then markers corresponding to that client are set for those parts because the server has gotten a confirmation that the packets were received. Thus, the server knows which packets the client has not received and can send them out. In certain exemplary illustrative embodiments, alternatively, or in addition, the markers may be stored on the client side device.

Upon processing the client request, the server determines whether or not packets are still needed by this client 337. If the file is complete, then the server can exit 339 processing for this particular request. If the client still needs packets, the server can send out a needed packet 341 and update the corresponding client marker 343. The server must also check the queue to see if other clients were requesting the same file 349. For example, if there were ten other clients requesting the same file, then the server would update the markers corresponding to those clients 351 so that when any of those clients reached the front of the queue, the server would not waste time re-sending a packet that that client h ad already received. The server then checks the packet markers for the current file 335 to determine again if any packets are additionally needed 337.

Figure 9:
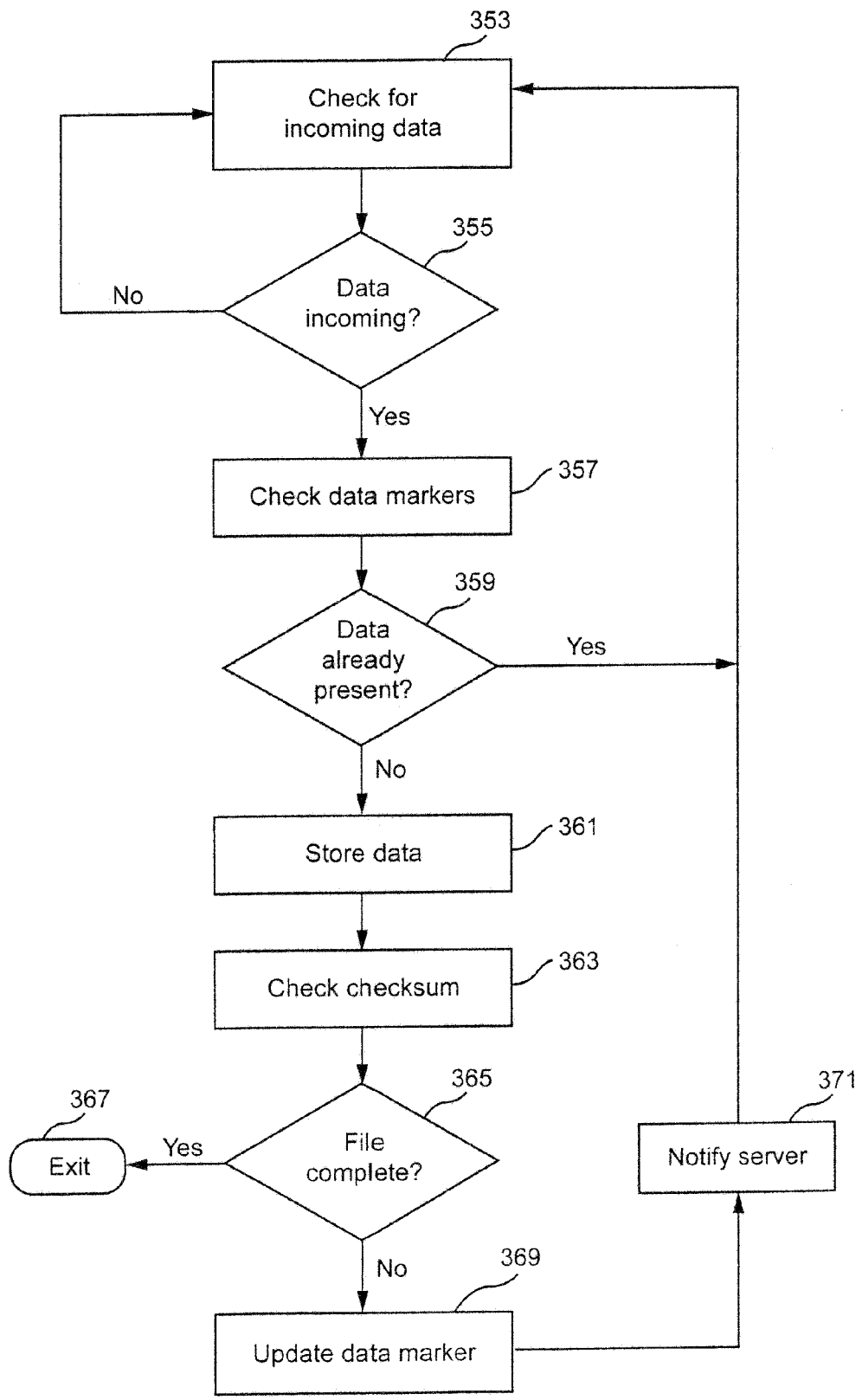

FIG. 9 shows a flowchart detailing an exemplary server information receipt processing operation. According to one aspect of the illustrative exemplary non-limiting implementations, a client may use a checksum to verify that a file has been fully received. If the client updates this checksum based on the packets received, then it would be best if the client does not redundantly store a packet and mistakenly alter the checksum based on this redundant store. To that end, the client may be provided with a method to protect against redundant packet storage, an exemplary flow of which is shown in FIG. 9.

The client, which knows it is waiting for a request, checks for incoming data 353. If incoming data is detected 355, the client checks an internal set of data markers 357. These markers are similar to the markers kept by the server and aid the client in determining which pieces of information still need to be stored. If the client determines that a particular packet is already present, the client does not store the packet and update the checksum. Using the example from above, the client would have markers two, three, and seven set, indicating that if packets two, three, or seven were detected, the client would not store that data again. If a particular packet does not need to be stored by a particular client, the client then goes back to checking for new incoming packets.

If the client does not yet have a detected packet, the client will store a copy of that packet 361 and adjust the checksum accordingly. The client then checks the checksum 363 to determine if the file is complete 365. If the checksum matches the expected sum, then the file is complete and the client no longer needs to look for the file. If the file is not complete, then the client can update the corresponding data maker and continue to look for additional incoming packets. The client may also notify the server 371 that the piece of information was received.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of efficiently downloading a file from a server to first and second devices, the method comprising:
    in response to a received request, distributing a sequence of portions of a file while maintaining a server stripe indicating which portions of the file still need to be distributed;
    maintaining, at the first device, a first device client stripe indicating at least which portions of the file distributed have already been captured by the first device;
    maintaining, at the second device, a second device client stripe indicating at least which portions of the file distributed have already been captured by the second device;
    discarding, with the first device, a distributed file portion that the first device client stripe indicates has already been captured by the first device;
    storing, with the second device, the same distributed file portion that the second device client stripe indicates has not yet been captured by the second device; and
    updating the second device client stripe to indicate that the second device has now captured the distributed file portion;
    wherein distributed file portions are selectively stored to the devices while avoiding having to perform portion reordering operations.

2. The method of claim 1, wherein the file is a game file.

3. The method of claim 2, wherein each said device is a game-playing device.

4. The method of claim 1, further comprising checking a checksum of the file each time a distributed file portion is stored.

5. A system for efficiently downloading a file, comprising:
    a server;
    at least first and second devices;
    wherein the server is configured to (a) receive requests and (b) in response to a received request, distribute a sequence of portions of a file while maintaining a first data structure indicating which portions of the file still need to be distributed;
    wherein the first and second devices are each configured to maintain second and third data structures, respectively, the second and third data structures indicating at least which portions of the file distributed have already been captured by the first and second devices, respectively;
    wherein a distributed file portion that the second data structure indicates has already been captured by the first device is discarded by the first device; and
    wherein the same distributed file portion that the third data structure indicates has not yet been captured by the second device is stored by the second device;
    wherein the third data structure is updated to indicate that the second device has now captured the distributed file portion; and
    wherein distributed file portions are selectively storable to the devices while avoiding having to perform portion reordering operations.

6. The system of claim 5, wherein the file is a game file.

7. The system of claim 6, wherein each said device is a game-playing device.

8. The system of claim 5, wherein the first and second devices are further configured to check a checksum of the file each time a distributed file portion is stored.

9. A method of efficiently downloading a file from a server to at least first, second, and third handheld portable wireless devices in which the server, in response to a received request, is configured to distribute a sequence of portions of a file while maintaining a server stripe indicating, for each of the handheld portable wireless devices making a request, which portions of the file still need to be distributed, the method comprising:
    maintaining, at the first device, a first device client stripe indicating at least which portions of the file distributed have already been captured by the first device;
    maintaining, at the second device, a second device client stripe indicating at least which portions of the file distributed have already been captured by the second device;
    maintaining, at the third device, a third device client stripe indicating at least which portions of the file distributed have already been captured by the third device;
    filtering out, via the first device, distributed file portions that the first device client stripe indicates have already been stored by the first device;
    filtering out, via the second device, distributed file portions that the second device client stripe indicates have already been stored by the second device;
    filtering out, via the third device, distributed file portions that the third device client stripe indicates have already been stored by the third device;
    storing, on the first device, distributed file portions that are not filtered out by the first device;
    storing, on the second device, distributed file portions that are not filtered out by the second device;
    storing, on the third device, distributed file portions that are not filtered out by the third device; and
    updating the first, second, and third client stripes when distributed file portions are stored to the first, second, and third devices, respectively.

10. The method of claim 9, wherein the file is a game file.

11. The method of claim 10, wherein each said device is a game-playing device.

12. The method of claim 9, wherein distributed file portions are selectively stored to the devices while avoiding having to perform portion reordering operations.

13. The method of claim 9, further comprising checking a checksum of the file each time a distributed file portion is stored.

14. A method of distributing files from a server to a plurality of portable game devices in operable communication with the server, each said file being decomposable into a plurality of portions, the method comprising:
    maintaining a queue of requests for files from the game devices;
    identifying one or more portions of the file associated with the request first in queue needed by the game device associated with request first in queue;
    maintaining, on the server, a server stripe identifying both transmitted and not yet transmitted portions of the file; and transmitting each said needed portion of the file associated with the request first in queue, from the server, to the game device associated with the request first in queue and to at least one other game device that also has requested the file, wherein each said game device maintains a client stripe, each said client stripe indicating which portions of the file being transmitted have already been received by the respective game device so that the respective game device can selectively ignore such portions.

15. A method of receiving files from a server in a network environment comprising a plurality of game devices, the method comprising, on behalf of a given one of said game devices:

requesting a file from the server, the server being configured to (a) maintain a queue of requests for files from the game devices, (b) identify one or more portions of the file associated with the request first in queue needed by the game device associated with request first in queue, (c) maintain a first record of both transmitted and not yet transmitted portions of the file, and (d) transmit each said needed portion of the file associated with the request first in queue to the game device associated with the request first in queue and to other game devices that also have requested the file;

receiving portions of the file transmitted from the server;

maintaining a second record on the game device indicating which portions of the file being transmitted have already been received; and consulting the second record as portions of the file are received so that already received portions are selectively ignored while not yet received portions are selectively stored to the game device.

16. A method of distributing files from a server to a plurality of client devices in operable communication with the server, the method comprising:

maintaining a queue of requests, each request being associated with a client device and a client request for a file, wherein at least one file is requested at least three separate times such that at least three requests are present in the queue, concurrently;

identifying one or more needed portions of the file associated with the request first in queue, the one or more needed portions of the file corresponding to portions of the file that the client device associated with the request has not yet received; and simultaneously sending the needed portions of the file for receipt by the client device associated with the request first in queue and for receipt by each client device also having requested the file; and maintaining a server stripe on the server, the server stripe identifying, for each request, downloaded portions of the file associated with the request and not yet downloaded portions of the file associated with the request;

wherein the each said client device is configured to (a) maintain a client stripe indicative of portions of the file being transmitted that have already been received by the client device, and (b) filter the portions of the file for selective storage on the client device with reference to the client stripe.

17. A method of distributing files from a server to a plurality of client devices in operable communication with the server, the method comprising:

maintaining a queue of requests, each request being associated with a client device and a client request for a file;

identifying one or more needed portions of the file associated with the request first in queue, the one or more needed portions of the file corresponding to portions of the file that the client device associated with the request has not yet received; and simultaneously sending the needed portions of the file for receipt by the client device associated with the request first in queue and for receipt by each client device also having requested the file; and maintaining a server stripe on the server, the server stripe identifying, for each request, downloaded portions of the file associated with the request and not yet downloaded portions of the file associated with the request;

wherein each said client device is configured to (a) maintain a client stripe indicative of portions of the file being transmitted that have already been received by the client device, and (b) selectively insert received portions of the file into an ultimate version of the file on the client device without having to reorder the portions after all of the portions have been received.

18. A method of efficiently sending files from a server to requesting devices, the method comprising:

maintaining a queue of requests for files from the requesting devices;

maintaining a first record indicating, for each request in the queue, which portion(s) of the associated file have been distributed and which portion(s) still need to be distributed;

sending, to each requesting device having requested the file associated with the first request in the queue, each portion of the file that the first record associated with the first request in the queue indicates still needs to be distributed while correspondingly updating the first record across the requests in the queue for the associated file to reflect which portion(s) of the associated file have been distributed and which portion(s) still need to be distributed;

removing the first request in the queue once the corresponding first record indicates that all portions of the associated file have been distributed; and repeating the sending and the removing for each request in the queue;

wherein distributed file portions are selectively stored to the requesting devices while avoiding having to perform portion reordering operations thereon and also while avoiding having to remove duplicate distributed file portions therefrom.

19. The method of claim 18, wherein the file is a game file.

20. The method of claim 19, wherein each said device is a game-playing device.

21. The method of claim 18, further comprising checking a checksum of the file each time a distributed file portion is stored.

22. The method of claim 18, wherein each said requesting device is configured to maintain a second record indicating which portions of files requested by that device have been downloaded thereto.

23. A system for efficiently sending files, comprising a server configured and a plurality of requesting devices, wherein the server is configured to at least:

maintain a queue of requests for files from the requesting devices;

maintain a first record indicating, for each request in the queue, which portion(s) of the associated file have been distributed and which portion(s) still need to be distributed;

send, to each requesting device having requested the file associated with the first request in the queue, each portion of the file that the first record associated with the first request in the queue indicates still needs to be distributed while correspondingly updating the first record across the requests in the queue for the associated file to reflect which portion(s) of the associated file have been distributed and which portion(s) still need to be distributed;

remove the first request in the queue once the corresponding first record indicates that all portions of the associated file have been distributed; and repeat the sending and the removing for each request in the queue wherein distributed file portions are selectively stored to the requesting devices while avoiding having to perform portion reordering operations thereon and also while avoiding having to remove duplicate distributed file portions therefrom.

24. The system of claim 23, wherein the file is a game file and each said requesting device is a game-playing device.

25. The system of claim 23, wherein each said requesting device is configured to maintain a second record indicating which portions of files requested by that device have been downloaded thereto.

26. A non-transitory computer readable storage medium tangibly storing software that, when executed by at least one processor of a server, efficiently sends one or more files to one or more requesting devices out of a plurality of devices in communication with the server, wherein the server is configured to at least:

maintain a queue of requests for files from the requesting devices;

maintain a first record indicating, for each request in the queue, which portion(s) of the associated file have been distributed and which portion(s) still need to be distributed;

send, to each requesting device having requested the file associated with the first request in the queue, each portion of the file that the first record associated with the first request in the queue indicates still needs to be distributed while correspondingly updating the first record across the requests in the queue for the associated file to reflect which portion(s) of the associated file have been distributed and which portion(s) still need to be distributed;

remove the first request in the queue once the corresponding first record indicates that all portions of the associated file have been distributed; and repeat the sending and the removing for each request in the queue;

wherein each requesting device is configured to ignore and to avoid storing thereon distributed file portions that already have been received and stored thereon, the ignoring being performed after consultation with a second record of the requesting device.

27. A server configured to efficiently send one or more files to one or more requesting devices out of a plurality of devices in communication with the server, wherein the server is configured to cooperate with at least one processor to at least:

maintain a queue of requests for files from the requesting devices;

maintain a first record indicating, for each request in the queue, which portion(s) of the associated file have been distributed and which portion(s) still need to be distributed;

send, to each requesting device having requested the file associated with the first request in the queue, each portion of the file that the first record associated with the first request in the queue indicates still needs to be distributed while correspondingly updating the first record across the requests in the queue for the associated file to reflect which portion(s) of the associated file have been distributed and which portion(s) still need to be distributed;

remove the first request in the queue once the corresponding first record indicates that all portions of the associated file have been distributed; and repeat the sending and the removing for each request in the queue;

wherein each requesting device is configured to ignore and to avoid storing thereon distributed file portions that already have been received and stored thereon, the ignoring being performed after consultation with a second record of the requesting device.

* * * * *